United States Patent Office 3,843,402
Patented Oct. 22, 1974

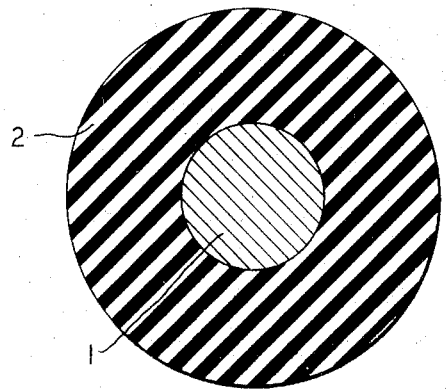

3,843,402
STABILIZED IRRADIATION CROSS-LINKED
PVC COATED ARTICLES
Robert Vincent Albarino, New York, N.Y., and Edward
Paul Otocka, Berkeley Heights, N.J., assignors to Bell
Telephone Laboratories, Incorporated, Murray Hill,
N.J.
Filed Dec. 7, 1971, Ser. No. 205,495
Int. Cl. B44d 1/42; H01b 3/44
U.S. Cl. 117—232                                    6 Claims

ABSTRACT OF THE DISCLOSURE

Development of color centers in irradiation cross-linked PVC is minimized by inclusion of a class of additive materials. Such materials, exemplified by a tetrahydrofuran derivative containing at least one additional carbonaceous substituent of a molecular weight of at least 50, are cyclic ethers in which there is at least one hydrogen substituent alpha to an ether oxygen. Of particular interest is the stabilization of polymer compositions utilized as primary wire insulation.

BACKGROUND OF THE INVENTION

(1) Field of the Invention

The invention is concerned with irradiation cross-linked polyvinyl chloride compositions and, particularly, to such compositions which are stabilized against, inter alia, the development of color centers both during but primarily subsequent to cross-linking. Such compositions are currently of interest for use as primary insulation on switchboard wiring as well as wiring intended for other use where physical toughness is required.

(2) Description of the Prior Art

At this time, one form of switchboard wire, as well as other types of wire, which is subjected to mechanical abrasion during installation or use is insulated by successive layers of (1) a polyvinyl chloride primary insulation, (2) a textile layer, and (3) a lacquer layer. This structure, an industry standby for many years, offers abrasion resistance, and resistance to heating encountered during soldering.

A simplified structure which offers comparable properties at a significant saving in manufacturing cost is now under active investigation. This structure includes but a single coating. This coating, a polymeric composition, is primarily composed of PVC which is irradiation cross-linked via a cross-linking monomer. Additional ingredients may include colorants, processing aids, and stabilizers. Color stabilization is of a particular significance for insulation use where reliance is frequently had on color coding to identify particular conductors, for example, in multiconductor cable.

Development of color centers, which may be initiated during cross-linking, continues during life. Such centers may be sufficient to make identification difficult over sufficiently short interval as to pose a difficulty during installation. Use of increased amounts of conventional stabilizers such as tin mercaptides contained in amounts as much as 10 parts by weight, appears to be effective in preventing development of color over a reasonable interval. Cost of such additives is significant.

SUMMARY OF THE INVENTION

In accordance with the invention, polyvinyl chloride (PVC) containing a cross-linking monomer is stabilized against color center development during and subsequent to irradiation cross-linking by inclusion of any of a class of cyclic ethers. All compounds of this class contain at least one hydrogen substituent on a carbon which is adjacent an oxygen ring member, and it is to this hydrogen that effective stabilization is ascribed. While a more detailed description of the class together with an illustrative listing of appropriate ethers is set forth in the Detailed Description, certain general requirements may be simply stated. Included compounds are monethers and diethers either of which may be five or six-membered. Ring members are generally carbonaceous at positions other than that of the noted oxygen. In general, there are no requirements with respect to substituents (other than the alpha hydrogen) except that certain substituents, such as amines, known to enhance HCl evolution must be avoided. From the standpoint of retention, during fabrication and at usual operating temperatures and for usual life expectancy, it is preferred that there be at least one substituent which has a molecular weight of at least 50. This requirement is usually met by a carbonaceous substituent containing four or more carbon atoms. The amount of cyclic ether additive generally lies within the range of from 1 to 20 parts by weight based on 100 parts polymeric composition. Ingredients other than the base polymer, cross-linking monomer, and cyclic ether are generally conventional. They may include colorant, conventional thermal stabilizer, processing aids, plasticizer, etc. All such ingredients are discussed in the Detailed Description.

While the invention is equally applicable to material regardless of physical form and may be usefully applied, for example, to sheet and other molded forms, primary commercial significance is considered to reside in wire insulation. The Detailed Description is largely in terms of such preferred embodiment although it is apparent that all processing parameters are equally applicable to the defined composition regardless of physical form or use.

BRIEF DESCRIPTION OF THE DRAWING

The figure is a cross-sectional view of an insulated wire in accordance with the invention.

DETAILED DESCRIPTION

(1) The Drawing

The figure depicts a conductor 1 coated by a primary insulation layer 2. Layer 2 is a PVC base polymer in accordance with the description herein.

(2) Composition (A) Inventive stabilizer.—It has been indicated that the stabilizer incorporated in accordance with the invention is necessarily a cyclic ether which, while it may take a variety of forms, must, of necessity, have one characteristic in common, i.e., there must be at least one hydrogen substituent attached to a carbon ring member which is, in turn, adjacent an ether oxygen. It has been generally indicated that there may be more than one or two oxygen atoms in the ring, that there may be more alpha hydrogens, e.g., as many as four alpha hydrogen relative to a particular oxygen, and that aside from oxygen atoms the other ring atoms are only carbon. The foregoing characteristics have been empirically determined, and, in each instance, there has been sufficient experimental information developed to conclusively evidence sufficient loss of effectiveness where departure has been made. From the enumerated examples, it is seen that ring members may be five-membered or six-membered and may contain a virtually unlimited variety of additional substituents. Such substituents may take cyclic or aliphatic form and may be saturated or unsaturated (cyclic substituents may be aromatic or not). In fact, the only substituents found to be harmful are those which are known to be undesirable by reason of chemical activity with respect to other components of the composition. The primary example is amino substituents which enhance PVC degradation by HCl evolution.

While nonhydrogen substituents may take such a variety of forms or may, in fact, be totally absent from a fundamental standpoint, activity depends solely on the noted alpha hydrogen (even deterioration of polymer itself which may be enhanced by an amino substituent is not believed to affect the fundamental protective mechanism). It is, however, preferred to include substituent material other than hydrogen in the usual composition. For ordinary use, where temperature may be expected to rise to usual ambient levels and, particularly, where protection due to radiation initiated deterioration is desired over a period of years, certain restrictions on substituent result. Retention of these materials requires that there be at least one substituent, either cyclic or aliphatic, which has a molecular weight of at least 50 and, more preferably, at least 100. In the usual situation where such substituents are carbonaceous, this desideratum is satisfied by a substituent containing at least four or more preferably at least 8, carbon atoms.

Inventive stabilizers are simply the five and six-membered cyclic ethers containing either one or two ether oxygens the remaining ring atoms being carbon. To the person skilled in the art, cyclic ethers are generally non-aromatic structures and such is intended. In the usual situation, the ether ring is saturated. Cyclic ethers are generally saturated by hydrogen or other appropriate substituents. Chemically, the categories so defined are tetrahydrofuran, 1,3 dioxolane, tetrahydropyran, and the two isomeric dioxanes as well as their derivatives. This grouping includes all permitted cyclic ethers including rings which contain only oxygen and carbon with all members described in their unsubstituted form. Additional substituents are not only permitted but are preferred, as discussed above.

Substituents suitably included on the ring structure included aliphatics such as alkyl, halogen substituted alkyl, hydroxy ether, carbonyl, alcohol, ester, acid, etc. In addition, a variety of cyclic substituents are usefully incorporated. These may be incorporated as single bond substituents as through a methylene or other bridge, or may take the form of alpha-beta substituents. The latter is illustrated, for example, by compounds containing one or two aromatic substituents (e.g., two hydroxy methyl-1,4 benzodioxane dibenzofuran). A variety of the types of substituted compounds are included in the examples.

Inclusion as indicated is from 1 to 20 parts based on the polymeric portion of the composition. The minimum is required for short term while the maximum assures reasonably long service life.

(B) Other constituents.—Materials discussed in this section are not, per se, inventive. With the exception of conductor materials, all such additional constituents may be incorporated in any inventive embodiment. With the exception of the base polymer and the cross-linking monomer, constituents listed are optional although, as workers will recognize, some are conventionally included and, from a practical standpoint, are necessary.

(1) Conductor.—The material of which the conductor is constructed is not critical. Commonly used conductors are copper and aluminum as well as alloys of either of these materials. It is common practice to tin conductors to aid in making solder joints and no complications are introduced by this conventional procedure.

(2) Polymer.—The basic polymer which is utilized in the invention compositions is polyvinyl chloride (PVC). Maximum abrasion resistance and also heat resistance result from use of the homopolymer. However, commercial PVC polymers which may contain up to 20 percent or preferably to a maximum of 10 percent by weight of co-monomers or other admixed material such as propylene, may be utilized without significant adverse effect. The PVC compound may be of any composition suitable for use as electrical insulation. In accordance with the A.S.T.M. standard for 1966, suitable compounds may be classified as within the range of from GP2–00003 to GP8–00003 inclusive. Definition of these classifications are set forth in the A.S.T.M. standard under designation D1755–66. Very briefly, the designation, GP, designates a general purpose resin. The first numerals (entries 4 through 7) represents a polymer molecular weight in terms of solution viscosity and the last digit, 3, indicates the usual preference for an electrical conductivity less than 6 mhos per cm. per gram. This electrical characteristic is, of course, not a basic requirement from the standpoint of the inventive teaching. The four ciphers in the designations indicate that the properies of particle size, apparent bulk density, plasticizer absorption and dry flow may be any A.S.T.M. designated level, i.e., 1–9, and, therefore, that these properties are not critical for the inventive purposes.

(3) Cross-linking medium.—The cross-linking medium necessarily contains a difunctional monomer of the type $CH_2C(CH_3)COO(CH_2)_xOCOC(CH_3)CH_2$,
$CH_2CHCOO(CH_2)_xOCOCHCH_2$, or
$CH_2C(CH_3)COO(CH_2CH_2O)_yCOC(CH_3)CH_2$ in which $x$ is an average value of from 3 to 40 and $y$ is an average value of from 1.5 to 20. It is desirable that at least 50 percent by weight and, preferably, at least 75 percent by weight of the cross-linking medium be made up of such monomer. The maximum limits in value of $x$ or $y$ (the two limits are equivalent since they specify the same number of carbon atoms) cannot be significantly exceeded since this results in a noticeable loss in abrasion resistance. The minimum limits in $x$ and $y$ are perhaps of greater consequence particularly in accordance with the preferred embodiment which avoids the use of a plasticizer. It is significant that the cross-linking monomer itself serves the function of plasticizing the compound sufficiently to permit expedient processing. While a fair degree of the plasticizer action is lost during irradiation, there is sufficient retention to impart the required flexibility for most wire and cable uses. This minimum limit in $x$ or $y$ is of consequence also where plasticizer is included since the amount of plasticizer required is reduced for the included class of cross-linking monomers. Elimination or minimization of plasticizer may be beneficial in several ways. Addition or increasing amounts of such ingredient dilutes otherwise excellent polymer properties and results in reduction of abrasion resistance, of fire retardance and of heat resistance. Other difficulties associated particularly with monomeric plasticizers which may be avoided incmlude lacquer-lifting, bleeding, temperature instability (particularly on aging), etc.

While the class of cross-linking monomers described above is essential to the invention, it is nevertheless permissible, as has been indicated, to admix up to 50 percent by weight or preferably a lesser amount of up to 25 percent by weight of a different cross-linking agent or agents. Example of such additives include butyl methacrylate which may impart greater flexibility (and when included in amount of at least 25 percent by weight of total cross-linking medium may permit halving the $x$ and $y$ minima above). Admixed cross-linking monomer of a different class may also serve to increase cross-linking efficiency. Trialkyl phosphate being a trifunctional rather than a difunctional monomer is exemplary.

It is convenient to discuss concentrations in terms of parts by weight based on 100 parts of polymer. Concentrations so designated, therefore, result in compositions having greater than 100 parts. The total amount of cross-linking monomers is within the range of from 10 to 50 parts. The minimum is required for sufficient cross-linking to produce the abrasion resistance and other properties which have been described, while exceeding the upper limit reduces fire retardance unduly.

(4) Plasticizer.—The preferred compositions include no plasticizer. In instances in which such additive is indicated, it may be added in amounts of up to about 20 parts. Exceeding this amount, again, has a deleterious effect not only on those very properties which are enhanced by cross-linking, i.e., abrasion resistance and heat resistance, but also on the excellent properties of PVC itself, i.e., fire retardance. Examples of suitable plasticizers are monomeric materials such as dioctyl phthalate and tricresyl phosphate, and polymeric materials such a polyethylene sebacate and polypropylene adipate. While it is a teaching of this invention that any given amount of plasticizer results in greater flexibility because of the cross-linking medium, selection of plasticizer or plasticizer mixture is based on the same considerations as apply to the thermoplastic polymer.

(5) *Stabilizer.*—These include PVC stabilizers of the usual type designed to prevent HCl evolution. Examples of such materials are basic lead salts such as tribasic lead sulfate, dibasic lead phthalate, and dialkyl tin compounds.

In the absence of the inventive stabilizer the recommended amount of conventional stabilizer is greater than that incorporated in the uncross-linked thermoplastic material (usually within the range of from about 5 to about 10 parts on the stated basis). Use of the inventive material permits conventional stabilizer inclusion to be reduced to from one to 5 parts.

(6) *Filler.*—Fillers such as calcium carbonate, titanium dioxide, and silica may be included in amounts of up to 30 parts on the basis described to (1) stiffen the product particularly where plasticizer is included and/or (2) to reduce cost.

(7) *Fire retardant.*—While in large part the commercial significance of the inventive product is due to its inherent fire retardance, extremely demanding use may indicate inclusion of an additional retardant. The usual materials, of which by far the most common is antimony oxide, may be included in up to three parts by weight for this purpose. Exceeding this upper limit is of little further benefit.

(8) *Lubricant.*—Wax or other lubricant may be added in amount of up to two parts by weight generally to serve as a processing aid. For certain applications, there may be further advantage in that use of such additive tends also to reduce adhesion between the insulation and the conductor.

(9) *Colorant.*—Another standard ingredient for many other purposes is colorant added for identification purposes. Colorants may be organic or inorganic and may be included in amounts of up to about one part by weight. It is well known that particular colorants are to be preferred (e.g., with a view to insulation properties, identification ease, etc.). Additionally, since the colorant and, for that matter, all other ingredients are present during irradiation, they should not be of such nature as to be deleteriously affected or to interfere with this procedural step.

(3) Processing

In this section, the general procedure for cross-linking a primary insulating coating on a conductor is discussed. The procedure described is equally applicable to other physical forms which may be assumed by the polymeric composition.

The following outline is exemplary only. Processing conditions are conventional, of course, with the exception of the irradiation step. Initial mixing may be by dry blending of the initial mix: (1) resin, (2) cross-linking medium, (3) plasticizer if any, (4) filler (also optional), (5) stabilizers and (6) lubricant. Most expediently the dry blend is gelled ("melted") and diced but it is also permissible to feed the dry blend directly into the extruder.

Following blending, the compound is extruded, again, in a conventional manner. For a 2½ inch extruder and crosshead and using 22 gauge wire to produce an 8 mil thick coating, extrusion rates of about 2500 feet per minute are easily achieved at a temperature of about 290 degrees F. at the extrusion head. Usual coating thickness for communication purposes is up to about 15 mil wall thickness.

The recommended radiation dose for these purposes is from 0.01 to 10 megarads. The various characteristics enhanced by cross-linking may be described, at least in part, in terms of the percent of polymer which is cross-linked, that is the weight percent of polyvinyl chloride rendered insoluble by the radiation treatment. It is seen that the recommended dose corresponds with a cross-link percentage on this basis of approximately 20 percent to something in excess of 60 percent depending on plasticizer content. Less radiation results in inadequate cross-linking to bring about a significant improvement either in abrasion resistance or heat resistance as compared with the thermoplastic material, while exceeding the upper limit leads to no further significant increase in these properties. Cross-linking is more effectively carried out in the absence of plasticizer, and, for this reason, a preferred maximum dosage where no plasticizer is present is about 5 megarads. For many purposes, a plasticized material may be sufficiently cross-linked for even the most demanding installations with a dose of only about one megarad. Of course, the effectiveness of the irradiation depends also on the nature of the cross-linking media and, as noted, efficiency may be increased by inclusion of a trifunctional monomer. In general, however, the maximum indicated dosage is not critical and may be exceeded. While further increase in dosage may result in increasing abrasion resistance and increasing heat resistance, these properties may be accompanied by an increase in stiffness. Accordingly, optimum dosage for any intended use depends on the nature of the properties desired.

In the above description, the term megarad is used in its conventional sense, i.e., the energy absorbed in the sample is $10^8$ ergs per gram. Since essentially all of the radiation is absorbed in the usual wire configuration at the generally used energy levels, this standardized nomenclature very nearly indicates the precise amount of energy taken up by the polymer.

Appropriate irradiation energies are known. For these purposes, particle energies should substantially exceed 100 kev. and should preferably attain a level of 300 kev. for 8 mil insulation. Suitable sources are electron beams such as may be produced by Van der Graaf accelerators; or gamma radiation may be utilized. The radiation dose should not exceed a level of about 15 megarads since the degradation rate may be increased so as to be uncontrollable by any feasible amount of stabilizer.

Inventive stabilizers are incorporated into the polymer composition, by any of several conventional processes. The stabilizer may be added to the resin prior to the addition of the cross-linking monomer or may be conveniently added to the monomer prior to blending with the resin. Certain of the examples utilize films which, for comparison purposes, were produced by uniform procedure of pressing between plates while heating for a period of about 10 minutes to a maximum of about 150 degrees C. with the plates under pressure of about 12,000 p.s.i.

In addition to the test results described in the subsequent section, a test was also conducted to determine inventive stabilizer retention. Such retention, for both molded and solid cast films, was checked by infrared spectroscopy. Stabilizer level was, in each instance reported in the examples, found to be substantially unaltered by processing and/or testing.

(4) Test Procedure

In the following section, examples are listed largely in terms of color development in essentially uncross-linked samples. While these examples 1 through 13 are indicative of radiolysis protection, it was necessary to correlate this data for samples containing cross-linking monomer. It has been established that radiolysis protection by use of the inventive compositions does not substantially interfere with the radiation cross-linking mechanism. That this is true is exemplified by data of the form presented in examples 14 through 17. In each of these examples, physical properties subsequent to cross-linking are such as to demonstrate the establishment of at least 20 percent cross-linking based on solubility considered sufficient to impart the necessary abrasion resistance and other properties which accompany cross-linking. Retardation of color centers was unaffected by inclusion of cross-linking monomer (for samples including inventive stabilizer).

Certain of the test data upon which the inventive teaching is based involved absorption measurement over the entire visible spectrum. It was soon observed, however, that color development at a wavelength of 5000 Angstroms was indicative of degradation in general and, accordingly, for simplicity, subsequent test data was conducted with absorption measurements reported solely at this wavelength. After irradiation with 1 mev. electrons to a dose of 5 mrad and storage as indicated, optical absorption data reported was measured on a UV-visible spectrophotometer with absorptions being normalized in terms of film thickness. All samples including inventive stabilizers, over the indicated range of from about 1 percent by weight to about 20 percent by weight based on the polymeric product, resulted in an absorption change of about 7 or less with this value representing the quotient of the change in absorption of 5000 Angstroms divided by film thickness. All reported tests were conducted under comparable conditions which included air storage for periods of from approximately 50 to 70 hours. A control consisting of PVC with no inventive stabilizer showed an absorbence increase of 28 (approximately 4 times the value for the poorest stabilized composition tested).

(5) Examples

Compositions of examples 1 through 13 were conducted on virgin PVC of a molecular weight of $1 \times 10^5$. In examples 14 through 17 such additives included cross-linking monomer sufficient to produce 20% cross-linking based on solubility. Examples are in tabular form with constituent members, other than PVC, as well as amount in weight percent being indicated in the first column. Columns 2 and 3 indicate storage time in nitrogen and in air, respectively (such storage time being found adequate for the purpose of detecting color center development due to radiolysis), while the final column indicates normalized absorbence change at 5000 Angstroms.

TABLE.—COLOR DEVELOPMENT IN IRRADIATED* POLYMER

| Ex. No. | Stabilizer compound | Amount, weight percent | $N_2$ storage time, hours | Air storage time, hours | $\Delta A_{5,000}$ A. X |
|---|---|---|---|---|---|
| 1 | Tetrahydrofuran | 8.5 | 19.1 | 49.2 | 0 |
| 2 | 3-hydroxy-tetrahydrofuran | 5.4 | 25.5 | 68.6 | 0.71 |
| 3 | 1,3-dioxolane | 7.3 | 19.8 | 71.5 | 0 |
| 4 | 1,4-dioxane | 9.5 | 19.8 | 71.6 | 0 |
| 5 | 1,3-dioxane | 9.2 | 19.9 | 71.7 | 0 |
| 6 | 2(Tetrahydrofurfuryl-oxy)-tetrahydropyran | 4.9 | 65.8 | 48.0 | 1.3 |
| 7 | 2(Tetrahydrofurfuryl-oxy)-tetrahydropyran | 2.2 | 22.2 | 69.6 | 7.5 |
| 8 | 2-hydroxymethyl-1,4-benzodioxane | 5.1 | 65.7 | 50.9 | 0.85 |
| 9 | 1,4-thioxane | 4.9 | 25.9 | 70.0 | 0 |
| 10 | Tetrahydropyran | 5.3 | 21.7 | 69.4 | 4.7 |
| 11 | 2-(2-chloroethoxy)-tetrahydropyran | 6.0 | 21.8 | 69.5 | 4.4 |
| 12 | Dibenzofuran | 5.1 | 19.8 | 75.8 | 7.8 |
| 13 | No stabilizer | | 25.4 | 67.9 | 28.0 |

*1 Mev. electrons—5 Mrad dose.

The following examples 14 through 17 were conducted on PVC samples containing cross-linking monomer. For comparison purposes, the examples set forth all utilize tetraethylene glycol dimethacrylate (TEGDM). Alternative or additional use of other difunctional or trifunctional monomers do not affect color development.

| Example No. | Stabilizer | Wt. percent | Storage time, hrs. at 75° C. | $\Delta A_{5,000}$ A. X |
|---|---|---|---|---|
| 14 | None | | 17 | >28 |
| 15 | 1,4-dioxane | 5 | 17 | 0 |
| 16 | 1,3-dioxolane | 9 | 17 | <10 |
| 17 | Tetrahydrofuran | <10 | 17 | <10 |

All compositions
 PVC resin, 100
 TEGDM, 40
 Stabilizer, as indicated
 Dose=5 mrad, 1 mev. electrons.

What is claimed is:

1. Article coated with a polymeric material consisting essentially of at least 80 percent by weight of polyvinyl chloride, said material being irradiation cross-linked through a cross-linking medium at least 50 percent by weight of which is a difunctional monomer, characterized in that said material contains from 1 to 20 parts by weight based on 100 parts of said polymeric material of at least one cyclic ether containing at least one hydrogen substituent atom in a position alpha to an ether oxygen, said ether containing at least one additional carbonaceous substituent of a molecular weight of at least 50, such ether including at least one compound selected from the group consisting of five and six-membered monoethers and diethers, ring members of which are restricted to carbon and ether oxygen atoms.

2. The coated article of claim 1 wherein the article is a wire.

3. Article of claim 2 containing at least 2 percent by weight of the said cyclic ether.

4. Article of claim 2 in which the said cyclic ether is selected from the group consisting of tetrahydrofuran, hydroxy tetrahydrofuran, dioxolane, dioxane, tetrahydrofurfuryloxy, tetrahydropyran, hydroxymethyl-benzodioxane, tetrahydrothiophene, thioxane, tetrahydropyran and thiodioxane.

5. Article of claim 4 in which the said cross-linking medium is at least one difunctional monomer selected from the group consisting of
$$CH_2C(CH_3)COO(CH_2)_xOCOC(CH_3)CH_2,$$
$$CH_2CHCOO(CH_2)_xOCOCHCH_2$$
and
$$CH_2C(CH_3)COO(CH_2CH_2O)_yCOC(CH_3)CH_2$$
in which $x$ is an average value of from 3 to 40 and $y$ is an average value of from 1.5 to 20.

6. Article of claim 5 in which said material contains a colorant included for identification purposes.

References Cited

UNITED STATES PATENTS

| 3,676,192 | 7/1972 | Hahn | 117—93.31 |
| 3,313,761 | 4/1967 | Barnes et al. | 117—232 X |
| 3,197,554 | 7/1965 | Baker | 174—112 |
| 3,660,331 | 5/1972 | Ludwig | 260—23 |
| 3,223,660 | 12/1965 | Pulver et al. | 260—23 |

OTHER REFERENCES

PVC Technology, Penn, pp. 365–368 (1962).
Polyvinyl Chloride, Sarvetnick, pp. 192–196 (1969).

WILLIAM D. MARTIN, Primary Examiner

H. J. GWINNELL, Assistant Examiner

U.S. Cl. X.R.

117—161 UF, UH, UT; 260—45.8 A

UNITED STATES PATENT OFFICE
CERTIFICATE OF CORRECTION

PATENT NO. : 3,843,402
DATED : October 22, 1974
INVENTOR(S) : Robert V. Albarino and Edward P. Otocka It is certified that error appears in the above-identified patent and that said Letters Patent are hereby corrected as shown below:

Column 3, line 47, after "benzodioxane" insert --and--.

Column 4, line 50, delete "incmlude" and insert --include--.

Column 5, line 8, delete "a" and insert --as--.

Signed and Sealed this eighteenth Day of November 1975

[SEAL]

Attest:

RUTH C. MASON
Attesting Officer

C. MARSHALL DANN
Commissioner of Patents and Trademarks